US006829931B2

(12) United States Patent
Jacek (10) Patent No.: US 6,829,931 B2
(45) Date of Patent: Dec. 14, 2004

(54) VOLUMETRIC LIQUID METERING DEVICE (75) Inventor: Stanley John Jacek, Wokalup (AU)

(73) Assignee: Innovative Agricultural Products Pty. Ltd., Benger (AU)

( * ) Notice: Subject to any disclaimer, the term of this patent is extended or adjusted under 35 U.S.C. 154(b) by 28 days.

(21) Appl. No.: 10/276,019
(22) PCT Filed: May 11, 2001
(86) PCT No.: PCT/AU01/00546
§ 371 (c)(1), (2), (4) Date: Nov. 12, 2002
(87) PCT Pub. No.: WO01/88487
PCT Pub. Date: Nov. 22, 2001

(65) Prior Publication Data
US 2003/0172732 A1 Sep. 18, 2003

(30) Foreign Application Priority Data
May 12, 2000 (AU) ............................................. PQ7441
Oct. 16, 2000 (AU) ............................................. PR0771

(51) Int. Cl.[7] ................................................. G01F 3/24
(52) U.S. Cl. ...................................................... 73/219
(58) Field of Search .......................... 73/219, 220, 222

(56) References Cited

U.S. PATENT DOCUMENTS

| 4,284,210 A | 8/1981 | Korak |
| 4,638,925 A | 1/1987 | Buchner |
| 5,560,523 A | 10/1996 | Chaki et al. |
| 5,865,225 A | 2/1999 | Weiss |
| 5,901,879 A | 5/1999 | Duhaime et al. |

FOREIGN PATENT DOCUMENTS

| DE | 3640343 A | 6/1988 | ............. G01F/3/36 |
| EP | 0 134 052 | 7/1984 | ........... G01F/11/28 |
| EP | 0 385 539 B2 | 6/1994 | ............. A01J/7/00 |

Primary Examiner—Edward Lefkowitz
Assistant Examiner—Jewel V. Thompson
(74) Attorney, Agent, or Firm—Duane Morris LLP (57) ABSTRACT

A volumetric liquid metering device has a meter chamber for receiving up to a predetermined volume of liquid, an inlet conduit for directing liquid into the meter chamber, a volumetric meter to indicate when the predetermined volume has entered, and a discharge conduit operable in response to a signal from the volumetric meter. The device can have a pair of coupled meter chambers, one b being filled as the other discharges. Valves control ingress and egress of liquid from the meter chambers, and alternate between chambers in response to a signal from the volumetric meter.

15 Claims, 7 Drawing Sheets

VOLUMETRIC LIQUID METERING DEVICE

FIELD OF THE INVENTION

The present invention relates to a volumetric liquid metering device that affords an improvement over known devices for measuring volumes of liquid, particularly for use in the dairy industry. The device is also suitable for measuring fruit juice and wine, or for measuring other continuous flow liquids such as water or petroleum.

BACKGROUND OF THE INVENTION

It has been found that electronic meters for the volumetric measurement of liquids, particularly milk, do not provide a sufficient degree of accuracy.

In the dairy industry it is a commonly accepted practice to allocate an amount of feed to an individual cow according to the volume of milk produced by the individual cow. For example, high volume producing cows receive more grain whilst low volume producing cows receive less grain. Accordingly, accurate measurement of the volume of milk produced per animal is required for the efficient and cost effective allocation of grain.

It is known to measure a volume of milk with a metering device comprising an electronic probe. Milk contains both butterfat and protein which behave as electrolytes. Once a certain volume of milk is accumulated in the meter, the butterfat and protein bridge an electrical circuit, thus triggering a reading. If the concentration of protein and butterfat in the milk remains constant then the accuracy of this method of volumetric measurement is satisfactory. However, in practice the concentration of butterfat and protein varies from cow to cow. Consequently, the volumetric measurement of milk with this particular device lacks consistent accuracy.

In contrast to the prior art, the present invention directly measures the volume of milk produced by the cow without relying on any other variable or parameter associated with the milk or liquid. Accordingly, the device of the present invention consistently affords a greater degree of accuracy over other prior art devices and methods.

The metering chamber of existing metering devices is calibrated in a fixed scale, for example, in liters. A further advantage of the volumetric liquid metering device of the present invention is that the operator has the option of being able to set the predetermined volume of the device and therefore is able to choose the unit of measurement in either metric or imperial units.

Today cows are producing a greater volume of milk than in the past as a result of improved genetics and better feeding techniques. Conventional methods of harvesting milk thus require increasingly larger diameter milk lines to collect the milk, which in turn need larger and more powerful vane pumps.

In current milk harvesting situations, the same line is used for the supply of vacuum to the milking plant and for the transport of milk to the milk receival vessel. The use of one line for two different purposes can be problematic, especially when a cow or a group of cows releases a surge of milk, causing the milk line to become restricted by flooding.

Flooding of the line has the effect of reducing the amount of vacuum available upstream of the restriction, often causing an interruption of vacuum supply to the upstream cows. The loss of vacuum supply upsets the cows by interrupting the milking routine and in extreme cases the upstream cow kicks off the cups.

To overcome this particular problem, the diameter of the milk line is increased to avoid interruptions to the vacuum supply. Alternatively, a system known as a loop line is installed. A loop line consists of two lines disposed parallel to one another and commonly connected at both ends to form a loop which allows the vacuum to be obtained from either side of the restriction caused by the high volume of milk.

The result of either increasing the diameter of the milk line or installing a loop line is the same. A greater demand is placed on the vane pump that supplies the vacuum. Accordingly, a large vane pump or a plurality of vane pumps is required with a consequent increase in energy consumption.

By segregating the vacuum supply from the milk transporting line there is a more uniform supply of vacuum for each cow and the milk lines do not have to be so large. It is therefore a further advantage of the present invention that when a plurality of volumetric liquid metering devices are used in a new milk harvesting situation the load on the vane pump is reduced, thus leading to energy savings.

The present invention has been designed so that it can also be installed in a dairy with conventional milk harvesting equipment such that only minor modifications to the system are required.

SUMMARY OF THE INVENTION

In accordance with one aspect of the present invention there is provided a volumetric liquid metering device comprising a meter chamber for receiving up to and including a predetermined volume of liquid, an inlet conduit for directing liquid into the meter chamber, a volumetric metering means to indicate when the predetermined volume of liquid has entered the meter chamber, and a discharge conduit for discharging liquid from the meter chamber in response to a signal from the volumetric metering means.

DETAILED DESCRIPTION OF AN EMBODIMENT OF THE INVENTION

The invention will now be described, by example only, with reference to the accompanying drawings in which.

Figure 6:
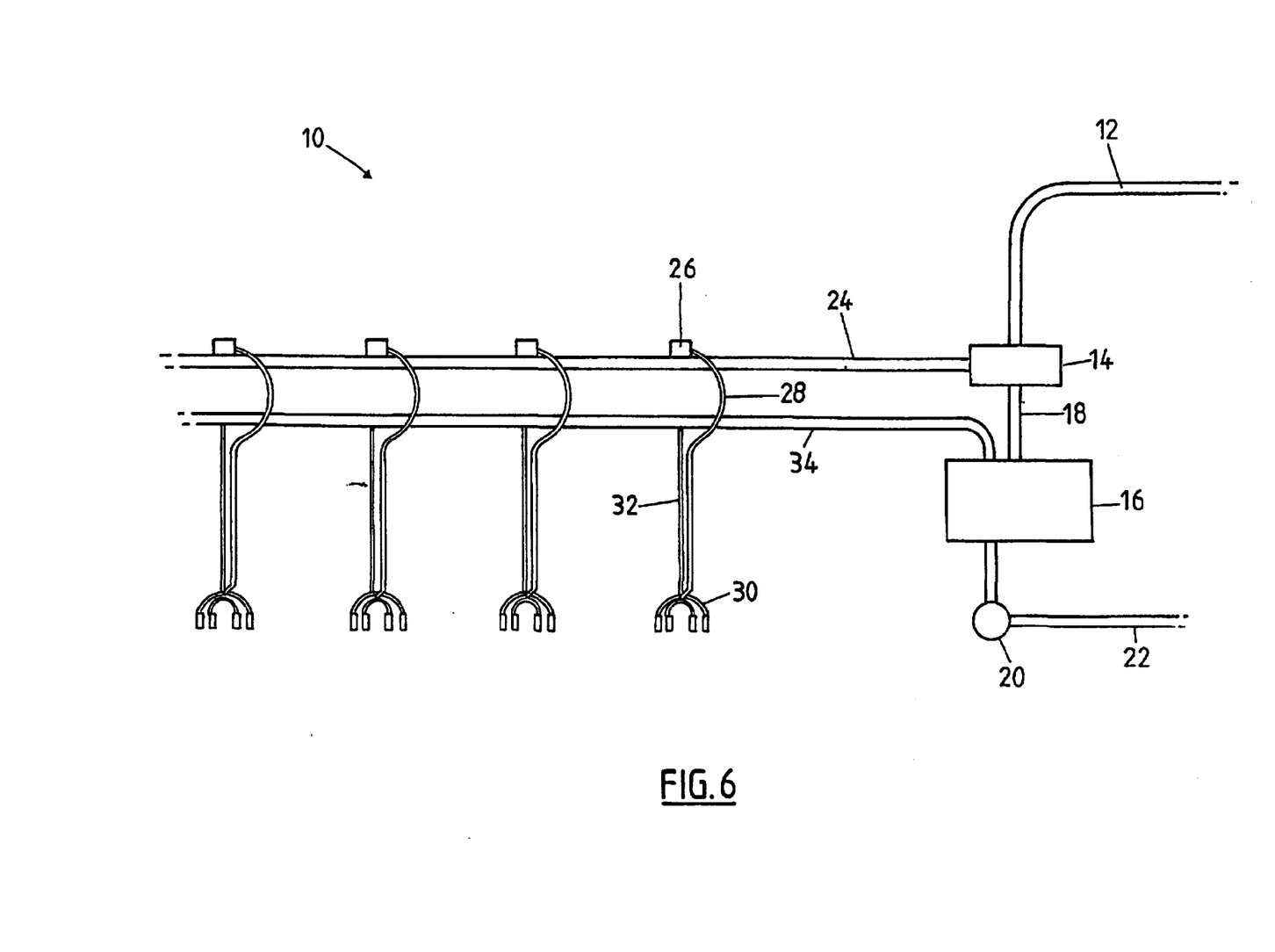
FIG. 6 is a schematic diagram of a conventional milking system by which a vacuum means harvests milk from a plurality of cows.

Referring to FIG. 6 there is shown a conventional milking system 10. The system 10 comprises a plurality of sets of cups 30, wherein each set of cups 30 is provided with a respective first milk delivery line 32 and a respective first vacuum line 28, a second milk delivery line 34, a second vacuum line 24 and a vane pump (not shown) which is commonly known as a vacuum pump.

Each first vacuum line 28 is endwise connected to the second vacuum line 24. The vane pump provides a vacuum to the system 10 via the third vacuum line which is endwise connected to the second vacuum line 24. It is common to locate an interceptor tank 14 between the second and third vacuum lines 24, 12 to prevent milk entering the vane pump via the third vacuum line 12. The second vacuum line 24 is also protected from inadvertent liquid suck back into the second vacuum line 24 by the interceptor tank 14.

Each first vacuum line 28 is provided with a pulsator 26. The pulsator 26 is a solenoid valve timed to open and close at predetermined periods causing an alternating vacuum to be applied along the first vacuum line 28 to the set of cups 30, thereby affording a pulsation effect on a part known as inflations which are located inside a shell of the cups 30. In this way, the sucking action of a calf on the teat is mimicked and milk can be extracted from the cow's udder.

The milk is then transferred along respective first milk delivery lines 32 into the second milk delivery line 34 and thence into a receival vessel 16. A centrifugal pump 20 transfers the milk stored in the receival vessel 16 to a main storage tank via a third milk delivery line 22. A vacuum is also commonly applied to the second milk delivery line 34 through a fourth vacuum line 18 which interconnects the interceptor tank 14 and the receival vessel 16.

It is envisaged that each set of cups 30 will be provided with a respective volumetric liquid metering device 1 as shown in FIGS. 1 to 5 and 7, wherein each device 1 is arranged to receive and meter milk received from its respective first milk delivery line 32 before the milk is discharged into the second milk delivery line 34.

Figure 1:
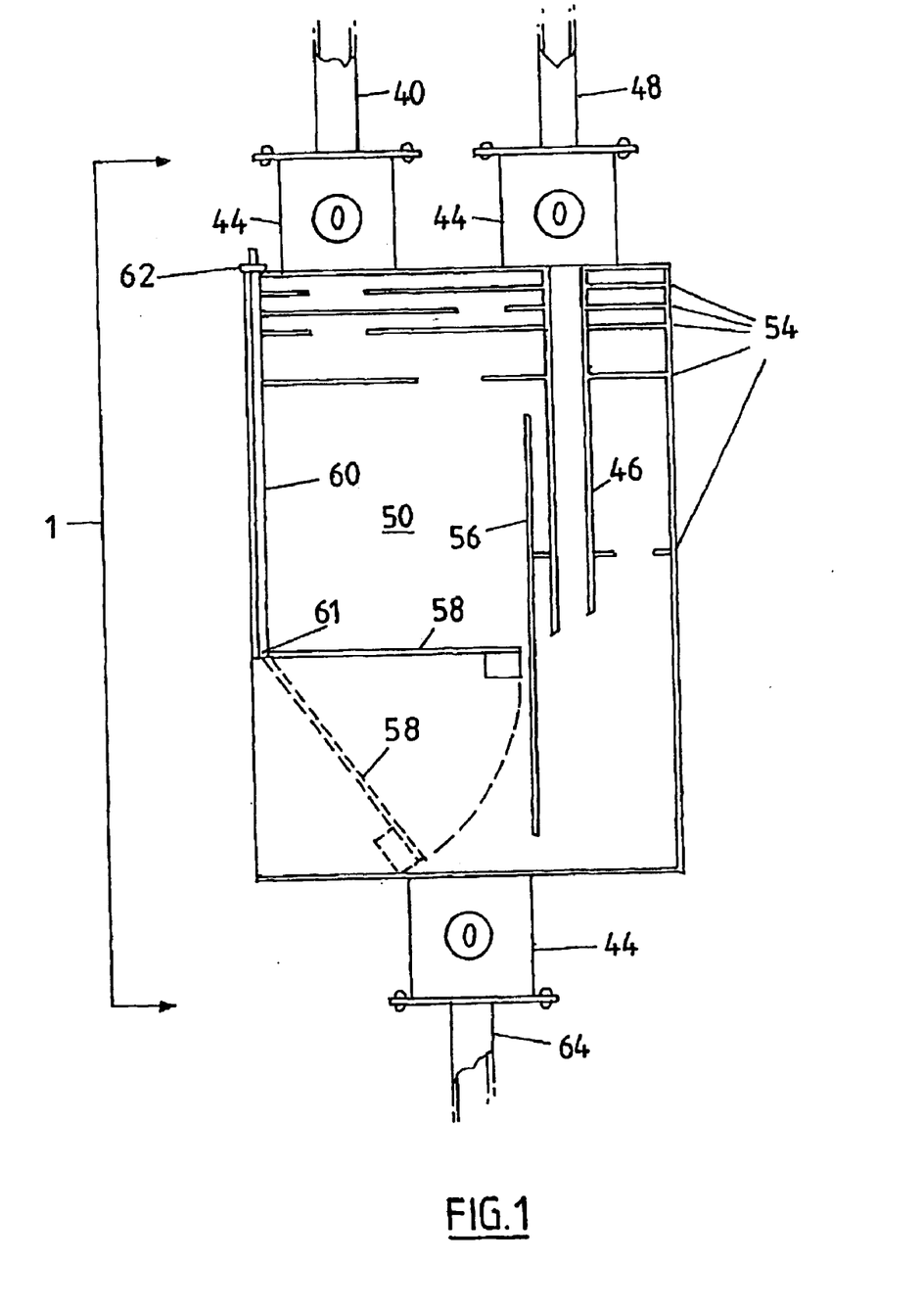
FIG. 1 is a diagrammatic side elevation view of a volumetric liquid metering device in accordance with the present invention.

Referring to FIG. 1 there is shown the volumetric liquid metering device 1. The volumetric liquid metering device 1 comprises a meter chamber 50 for receiving up to and including a predetermined volume of liquid, a inlet conduit 46 for directing liquid into the meter chamber 50, a vacuum conduit 40 for applying a vacuum to the meter chamber 50 in order to draw liquid into the meter chamber 50 via the inlet conduit 46, a volumetric metering means to indicate when the predetermined volume of liquid has entered the meter chamber 50, and a discharge conduit 64 for discharging liquid from the meter chamber 50 into the second milk delivery line 34 in response to a signal from the volumetric metering means.

The meter chamber 50 is either cylindrical or rectangular in shape, whichever is appropriate to best suit space constraints of the operating environment and the type of liquid which is to be measured.

For convenience, the meter chamber 50 is provided with a viewing panel (not shown) which allows an operator to visually monitor the performance of the device 1. It is envisaged that the viewing panel could comprise a major portion of the meter chamber 50.

The inlet conduit 46 is in fluid communication with a liquid supply conduit 48. The liquid supply conduit 48 is in fluid communication with the first milk delivery line 32. The inlet conduit 46 extends into an interior of the meter chamber 50 to direct liquid flowing from the first milk delivery line 32 into the meter chamber 50 for volumetric measurement. Ingress of liquid through the inlet conduit 46 and into the meter chamber 50 is controlled by a valve mechanism 3 shown in greater detail in FIG. 4. The valve mechanism 3 corresponding to the liquid supply conduit 48 is housed in a valve housing 44.

The vacuum conduit 40 is in fluid communication with the second vacuum line 24 so as to apply a vacuum to the meter chamber 50 in order to draw liquid into the meter chamber 50 via the inlet conduit 46. Application of vacuum through the vacuum conduit 40 is controlled by the valve mechanism 3 shown in greater detail in FIG. 4. The valve mechanism 3 corresponding to the vacuum conduit 40 is housed in valve housing 44.

The discharge conduit 64 is in fluid communication with the second milk delivery line 34. The discharge conduit 64 is arranged to discharge liquid from the meter chamber 50 into the second milk delivery line 34 when the meter chamber 50 is filled to its predetermined volume. Egress of liquid through the discharge conduit 64 and into the second milk delivery line 34 is controlled by a valve mechanism 3 shown in greater detail in FIG. 4. The valve mechanism 3 corresponding to the discharge conduit 64 is housed in a valve housing 44.

The volumetric metering means comprises a device which transmits a signal in response to detection of a predetermined volume of liquid in the meter chamber 50. For example, the volumetric metering means may comprise a laser beam disposed at a particular location in the meter chamber 50, to correspond with a predetermined volume of liquid, wherein a signal is emitted by the device when a rising liquid level in the meter chamber breaches the laser beam. Alternatively, the device may comprise a probe to detect the liquid, wherein the probe is disposed in the meter chamber 50 at a location corresponding with a predetermined volume of liquid, wherein a signal is omitted by the probe when it detects the liquid.

Preferably, the volumetric metering means comprises a float switch 58 fixed hingedly to a side wall of the meter chamber 50. The float switch is movable between a first position (represented in phantom) wherein the meter chamber 50 is empty, and a second position (represented in solid line) wherein the meter chamber 50 is filled to its predetermined volume. The ingress of liquid into the meter chamber 50 causes the float switch 58 to rise from the first position to the second position. When the float switch 58 is in the second position, an electrical circuit is caused to close, thus triggering a signal to activate the respective valve mechanisms 3 operating the inlet conduit 46, vacuum conduit 40, and discharge conduit 64, such that the further ingress of liquid into the meter chamber 50 through the inlet conduit 46 and vacuum applied to the meter chamber 50 via the vacuum inlet 40 are halted, and the predetermined volume of liquid received in the meter chamber 50 is discharged into the second milk delivery line 34 through the discharge conduit 64.

Where it is desired to volumetrically meter continuous flow liquids, such as fruit juice or wine, the device 1 is arranged such that the float switch 58 is fixed to an arm 60 by a hinged mechanism 61. The arm 60 depends downwardly into the interior of the meter chamber 50 through an aperture disposed in an upper wall of the meter chamber 50. The arm 60 is threaded through a compression nut 62 contiguously disposed on an exterior of the upper wall of the meter chamber 50. When the compression nut 62 is loosened the arm 60 can be slidably moved in an upward or downward direction such that the float switch 58 is located in an upper or lower portion of the interior of the meter chamber 50, accordingly. In this way the predetermined volume of the device 1 at which the float switch 58 is in the second position can be altered. Retightening the compression nut 62 ensures that atmospheric air cannot enter the meter chamber 50.

It is envisaged that the liquid supply conduit 48 would be provided with a probe and a timing means, wherein the probe and the timing means are arranged to transmit a signal to deactivate the volumetric metering means after no liquid has been sensed for a predetermined period of time in the liquid supply conduit 48. The signal would cause a commercial vacuum solenoid valve, located between the second vacuum line 24 and the vacuum conduit 40, to close thus shutting off vacuum supply to the meter chamber 50. Additionally, or alternatively, the pulsator 28 could be deactivated in response to the signal. In this way, the volumetric liquid metering device 1 can be isolated from the second vacuum line 24.

An upper portion of the meter chamber 50 is provided with a plurality of laterally extending baffle plates 54. Each baffle plate 54 is perforated with randomly spaced apertures. The apertures are arranged in a staggered configuration to encourage vacuum flow in the meter chamber 50 in an indirect line to the second vacuum line 24. In this way, it is envisaged that the potential for egress of liquid received in the meter chamber 50 into the second vacuum line 24, resulting from disturbance of liquid received in the meter chamber 50 by turbulence or steam, will be minimal.

When the cow kicks the milking cups 30 off its teats there is a sudden ingress of atmospheric air into the meter chamber 50 which is under vacuum when the device 1 is in use. The sudden ingress of air has an explosive or turbulent effect on the liquid already received in the meter chamber 50, causing the float switch 58 to act in an erratic manner between the first and second position, thereby resulting in a malfunction of the meter. Incorporation of a means to muffle liquid turbulence caused by a sudden ingress of atmospheric air into the metering chamber to minimise and absorb some of the kinetic force of the sudden ingress largely overcomes the abovementioned problem.

Figure 2:
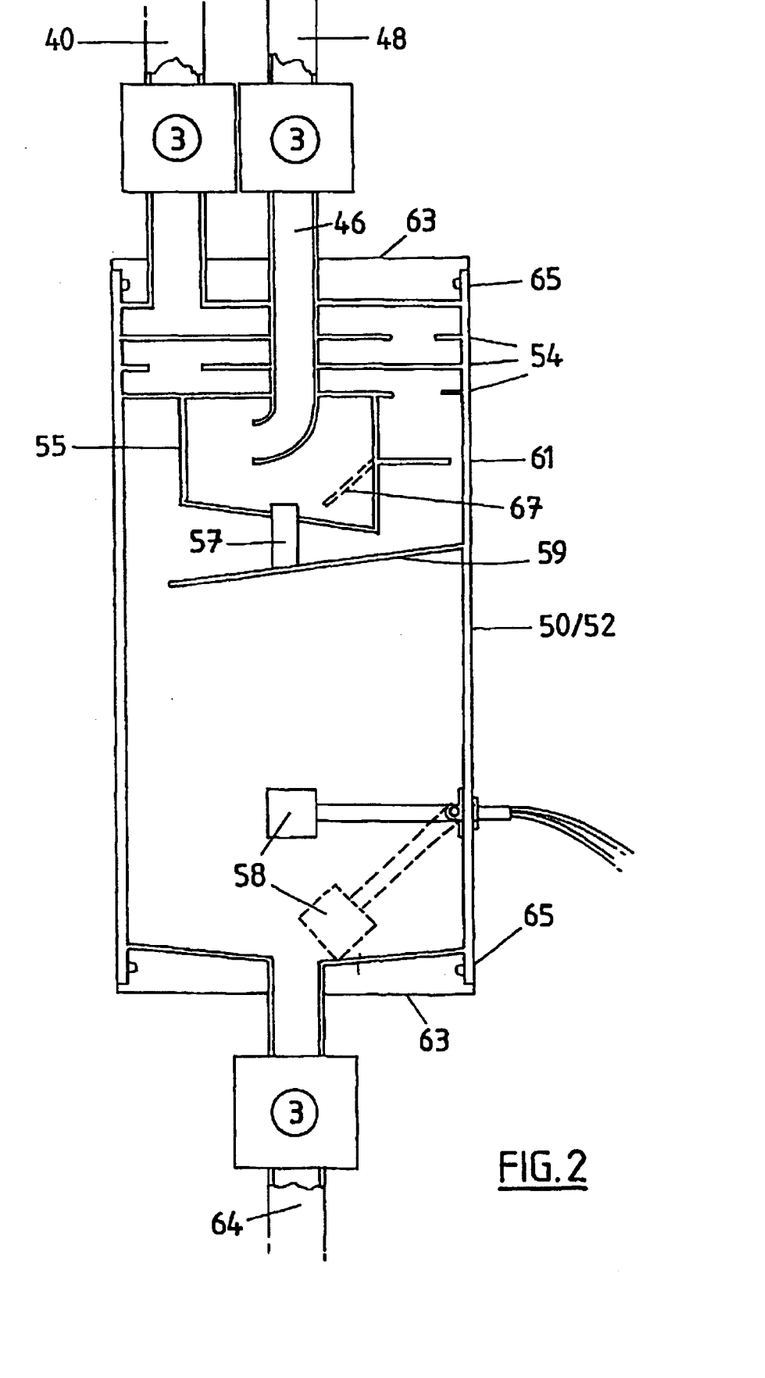
FIG. 2 is a diagrammatic side elevation view of the volumetric liquid metering device shown in FIG. 1 further comprising a means to muffle liquid turbulence caused by a sudden ingress of atmospheric air into the volumetric liquid metering device.

Preferably, the meter chamber 50 is further provided with a means to muffle liquid turbulence caused by a sudden ingress of atmospheric air into the volumetric liquid metering device 1, as shown in FIG. 2. The means to muffle liquid turbulence caused by a sudden ingress of atmospheric air into the volumetric liquid metering device comprises a blast chamber 55.

The blast chamber 55 is a box-like housing constructed around the inlet conduit 46 proximal to the baffle plates 54. The blast chamber 55 is provided with an appropriately sized opening to discharge fluid into a lower portion of the metering chamber 50. In the event of the cups 30 being kicked off by the cow, the blast chamber 55 has the effect of reducing the explosive effect caused by the rapid loss of vacuum caused by the introduction of atmospheric air into the meter chamber 50. The opening of the blast chamber 55 is configured with an appropriately designed bend 67 as shown by a dotted line in FIG. 2.

A downwardly inclined surge plate 59 is fixed by mounting straps 57 to an underside of the blast chamber 55. The surge plate 59 has the effect of segregating the meter chamber 50 into an upper compartment and a lower compartment so that the introduced atmospheric air which causes the blast effect is directed to the upper compartment and thence to the second vacuum line 24 via the vacuum conduit 40.

As milk is discharged from the blast chamber 55 it falls onto the downwardly inclined surge plate 59 and runs down to an end of the surge plate 59 where it is directed to the lower compartment of the meter chamber 50 which houses the float switch 58. Affixed to an exterior of the blast chamber 55 is a splatter plate 61, which reduces the incidence of liquid being pulled into the baffle plates 54 from the blast chamber 55. The abovementioned means allows for a smoother transition of the float switch 58 from the first position to the second position, and minimises the deviation of the float switch 58 due to pressure fluctuations when the float switch 58 is midway between the first and second positions.

It will be understood that the float switch 58 will be located in the interior of the meter chamber 50 such that when the float switch 58 is in the second position no liquid will be allowed to get above a given point in the meter chamber 50 and in so doing pass between the baffle plates and enter the second vacuum line 24 via the vacuum conduit 40.

Figure 3:
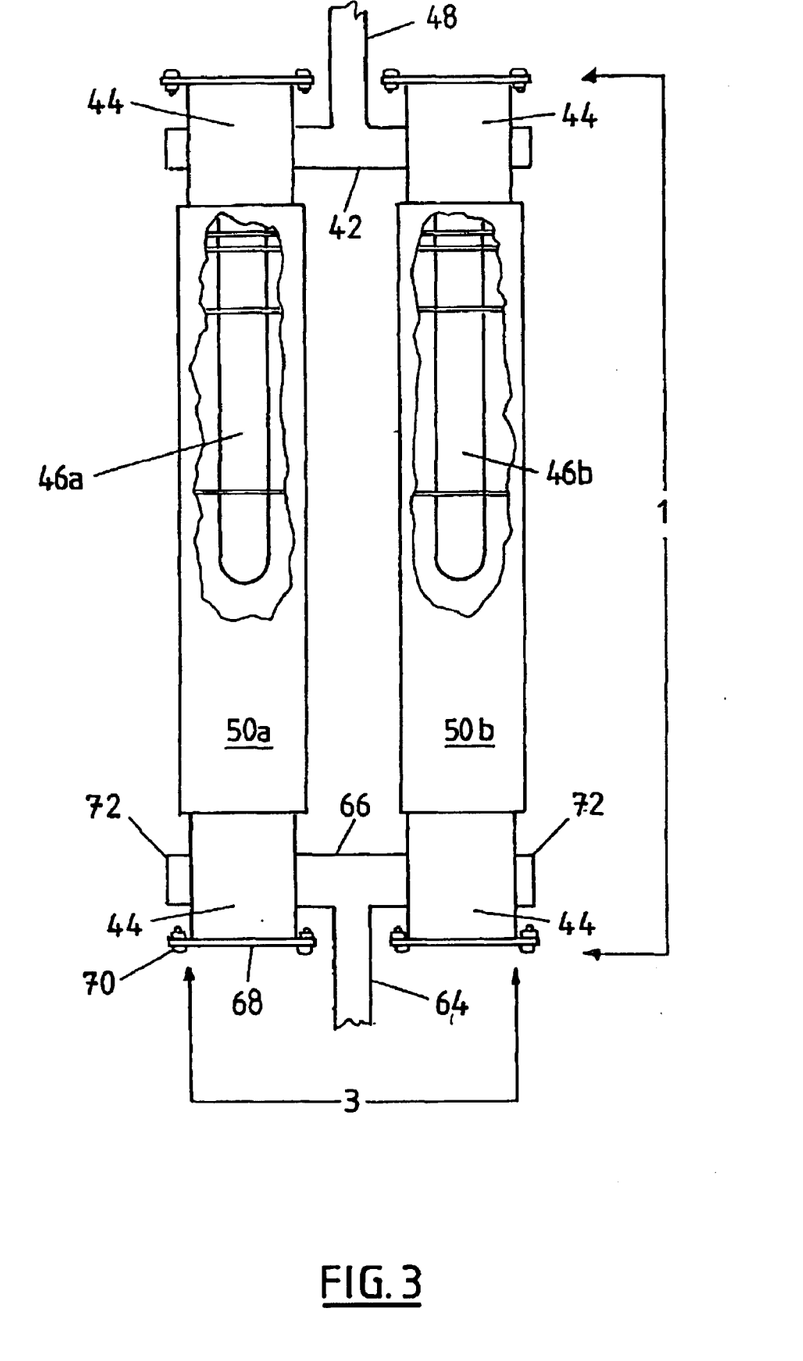
FIG. 3 is a diagrammatic end elevation view of a pair of coupled volumetric liquid metering devices as shown in FIG. 1.
Figure 4:
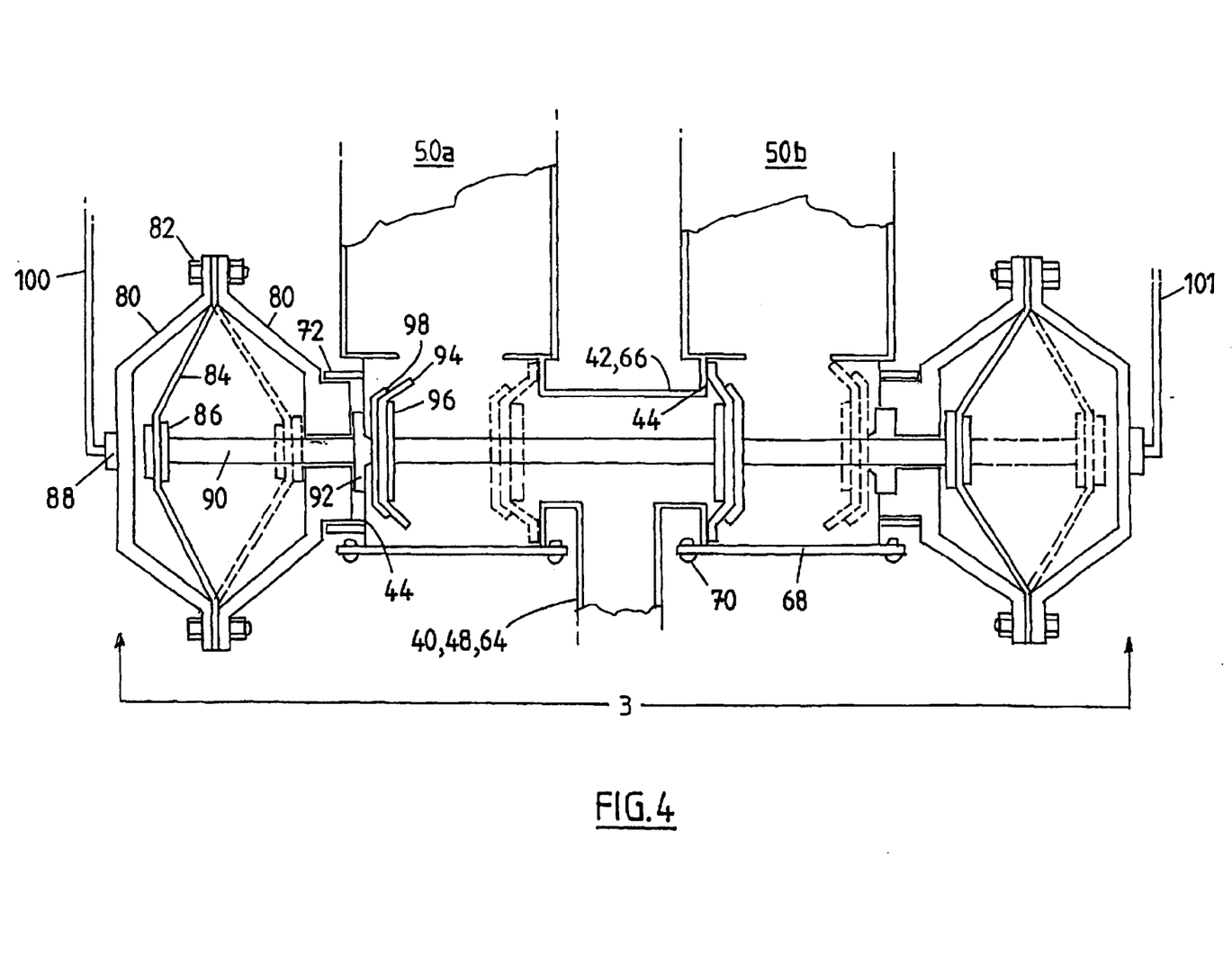
FIG. 4 is a detailed schematic diagram of an internal valve mechanism used in the devices shown in FIGS. 1 to 3.
Figure 5:
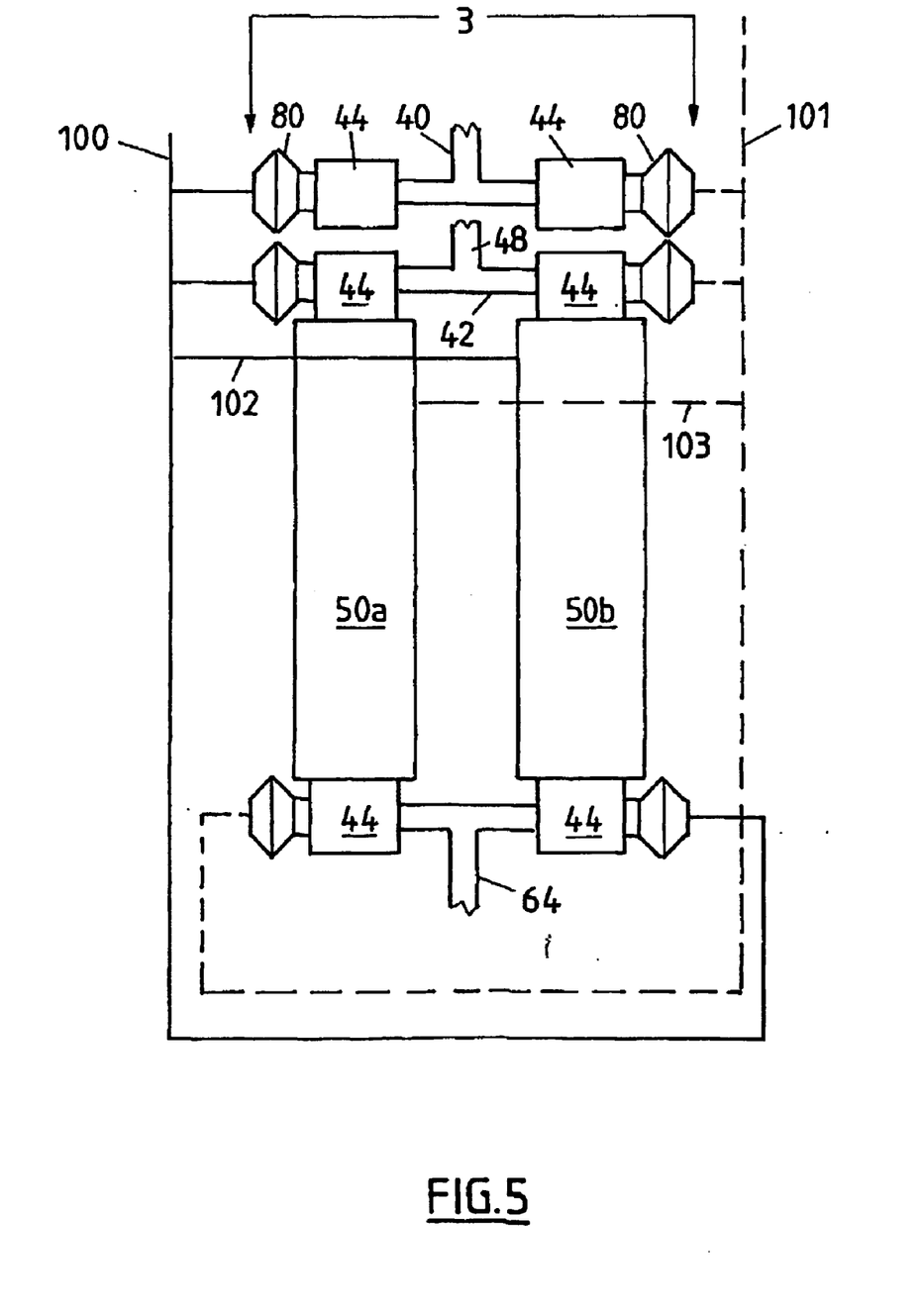
FIG. 5 is a schematic diagram of the pair of volumetric liquid metering devices shown in FIG. 3 coupled by the internal valve mechanism shown in FIG. 4.

Referring to FIGS. 3, 4, and 5, it is preferable that the volumetric liquid metering device 1 comprises a first meter chamber 50a and a second meter chamber 50b, including respective inlet conduits 46a and 46b, wherein the first and second meter chambers 50a, 50b are coupled together via a plurality of valve mechanisms 3.

The vacuum supply pipe 40 is endwise connected to a hollow T-shaped member 42 and a pair of valve housings 44. In this way, the first and second meter chambers 50a, 50b are both supplied with a vacuum by common vacuum supply pipe 40.

The liquid supply conduit 48 is endwise connected to its respective hollow T-shaped member 42 and pair of valve housings 44. In this way, respective inlet conduits 46a, 46b of the first and second meter chambers 50a, 50b are both supplied with liquid by common liquid supply conduit 48.

The discharge conduit 64 is endwise connected to a hollow T-shaped member 66 and respective pair of valve housings 44. In this way, liquid is discharged from the first and second meter chambers 50a, 50b via common discharge conduit 64.

The valve housings 44 house a plurality of valve mechanisms 3 as shown in FIG. 4. The plurality of valve mechanisms 3 refers to a set of valves, preferably three in number, which control switching between the first and second meter chambers 50a, 50b. Changing the position of the plurality of valving mechanisms 3 allows vacuum to be applied alternately between the first meter chamber 50a and the second meter chamber 50b.

For example, when vacuum is applied to the first meter chamber 50a to draw liquid through the liquid supply conduit 48 and the inlet conduit 46a, the valve mechanism 3 opens the first meter chamber 50a whilst closing off the second meter chamber 50b to any ingress of liquid through the liquid supply conduit 48 and the inlet conduit 46b.

Further, the plurality of valve mechanisms 3 are arranged such that when a meter chamber 50 is closed to vacuum, the valve mechanism 3 opens the meter chamber 50 to allow the predetermined volume of liquid contained therein to be discharged through the discharge conduit 64. Thus, to follow the abovementioned example, when the second meter chamber 50b is closed to vacuum, the valve mechanism 3 allows the second meter chamber 50b to be drained of its predetermined volume of liquid through the discharge conduit 64. In this way, whilst one meter chamber 50 is filling, the other meter chamber 50 coupled thereto is draining.

When the float switch 58 reaches the second position in the first meter chamber 50a, in other words, the predetermined volume of liquid has entered the first meter chamber 50a, the plurality of valve mechanisms 3 change position, in response to a signal from the float switch 58, to allow the second meter chamber 50b to be filled whilst the first meter chamber 50a empties.

It is envisaged that, in practice, the plurality of valve mechanisms 3 will continue to alternate between first and second meter chambers 50a, 50b until the cow has completed milking.

FIG. 4 shows the internal workings of the valve mechanism 3 which is common to all three valve mechanisms adjoined to the first and second meter chambers 50a and 50b as shown in FIG. 3.

A diaphragm casing 80 is of a split construction and held together by a suitable fastening means 82. The fastening means 82 also retains a diaphragm 84 in a fixed position within the diaphragm casing 80.

The diaphragm 84 is centrally held between a flat washer 86 and a retaining nut 88 which is fixed to a drive shaft 90. The drive shaft 90 is a common shaft running between two diaphragm casings 80 that are affixed either side of the first and second meter chambers 50a and 50b.

A suitable wiper seal, commonly found in pneumatics and hydraulics, is installed between the wall of the valve housing 44 and the diaphragm casing 80 to restrict access of liquid or air into the diaphragm casing 80.

The valve housing 44 has a suitable hole through one side to enable the drive shaft 90 to slide to the left or to the right. On the drive shaft 90 a suitable bucket seal 94 is held between a retaining washer 96 and a bucket housing 98 which is suitably fixed to the drive shaft 90.

This same configuration is repeated in the valve housing 44 affixed to the second meter chamber 50b but with the bucket seal 94 and the bucket housing 98 facing each other to enable the opening and closing of the first and second meter chambers 50a, 50b.

The solid lines show that the shaft has been forced over to the extreme left of FIG. 4 causing the right hand bucket seal 94 to come in contact with the wall of the valve housing 44 and the bucket seal 94 to flare out against the wall of the valve housing 44 thus blocking off entry to the second meter chamber 50b.

The bucket seal 94 in the solid line configuration has returned to its natural state in the valve housing 44 affixed to the first meter chamber 50a allowing for the entry of the vacuum means and/or the entry or discharge of the milk. The dotted line indicates the drive shaft 90 with the bucket housing 98, the bucket 94 and the retaining washer in its alternate configuration in which the first meter chamber 50a is closed.

There are provided first and second compressed air lines 100, 101, wherein first and second lines 100, 101 are the means to facilitate the reciprocal motion of the drive shaft 90 within the valve mechanism 3. A compressed air control solenoid valve for actuating the first and second compressed air lines 100, 101 in alternate order is also provided, wherein the compressed air control solenoid valve is arranged to actuate the first and second compressed air lines 100, 101 in response to a signal received from the float switch 58 of the first meter chamber 50a or the second meter chamber 50b when the float switch 58 is in the second position. When the appropriate signal is received from the float switch 58, compressed air is directed on to the diaphragm 84 causing the drive shaft 90 to move reciprocally within the valve mechanism 3 and thus open the first meter chamber 50a and close the second meter chamber 50b, or vice versa.

In other words, the transmission of the signal from the float switch 58 to the compressed air solenoid control valve will cause the plurality of valve mechanisms 3 to switch from one meter chamber 50 to the other coupled meter chamber 50 by acting upon the appropriate diaphragm in the plurality of valve mechanisms 3 as shown in FIG. 4.

FIG. 5 shows the first and second meter chambers 50a and 50b connected with the valve mechanisms 3 and the respective diaphragm casings 80. The valve mechanism 3 corresponding to the vacuum conduit 40 is shown in exploded view in relation to the first and second meter chambers 50a and 50b in order to clarify the working interrelationship between the first and second compressed air lines 100, 101 and the first and second meter chambers 50a and 50b.

Referring to FIG. 5, the black solid line represents a flow of compressed air via the first compressed air line 100 to three diaphragm casings 80 thus causing the respective drive shafts 90 (see FIG. 4) to move reciprocally within the valve mechanism 3. Air fills a void containing the diaphragm 84 and the casing 80 thus pushing the drive shaft 90 with the bucket seal 94 to the appropriate position.

In this particular example, the drive shafts 90 are pushed into a position to allow the second meter chamber 50b to be filled via the liquid supply conduit 48 and the inlet conduit 46b whilst the predetermined volume of liquid received in the first meter chamber 50a is discharged via the discharge conduit 64.

When the predetermined volume of liquid has entered the second meter chamber 50b, the respective float switch 58 rises to the second position and transmits a signal to the compressed air control solenoid valve. The compressed air control solenoid valve responds to the signal by actuating the second compressed air line 101 (shown in dotted outline).

In this way, the position of the plurality of valve mechanisms 3 is reversed to allow the first meter chamber 50a to commence filling via the fluid supply conduit 48 whilst the second meter chamber 50b commences discharging via the discharge conduit 64.

The third compressed air line 102 is connected to the second meter chamber 50b. A connection between the third compressed air line 102 and the second meter chamber 50b is opened when the second meter chamber 50b is discharging in order to break the retained vacuum in the second meter chamber 50b. In this way, faster discharge of liquid through the discharge conduit 64 is encouraged under positive pressure.

The fourth compressed air line 103 is connected to the first meter chamber 50a. A connection between the fourth compressed air line 103 and the first meter chamber 50a is opened when the first meter chamber 50a is discharging in order to break the retained vacuum in the first meter chamber 50a. In this way, faster discharge of liquid through the discharge conduit 64 is encouraged under positive pressure.

The valve housing 44 has an appropriate means for internal inspection through the cover 68 with a suitable gasket that is installed between the valve housing 44 and the cover 68 and retained by suitable fastening means 70.

The diaphragm casing 80 (see FIG. 4) is retained within a flange 72 and is fixed to the valve housing 44.

Figure 7:
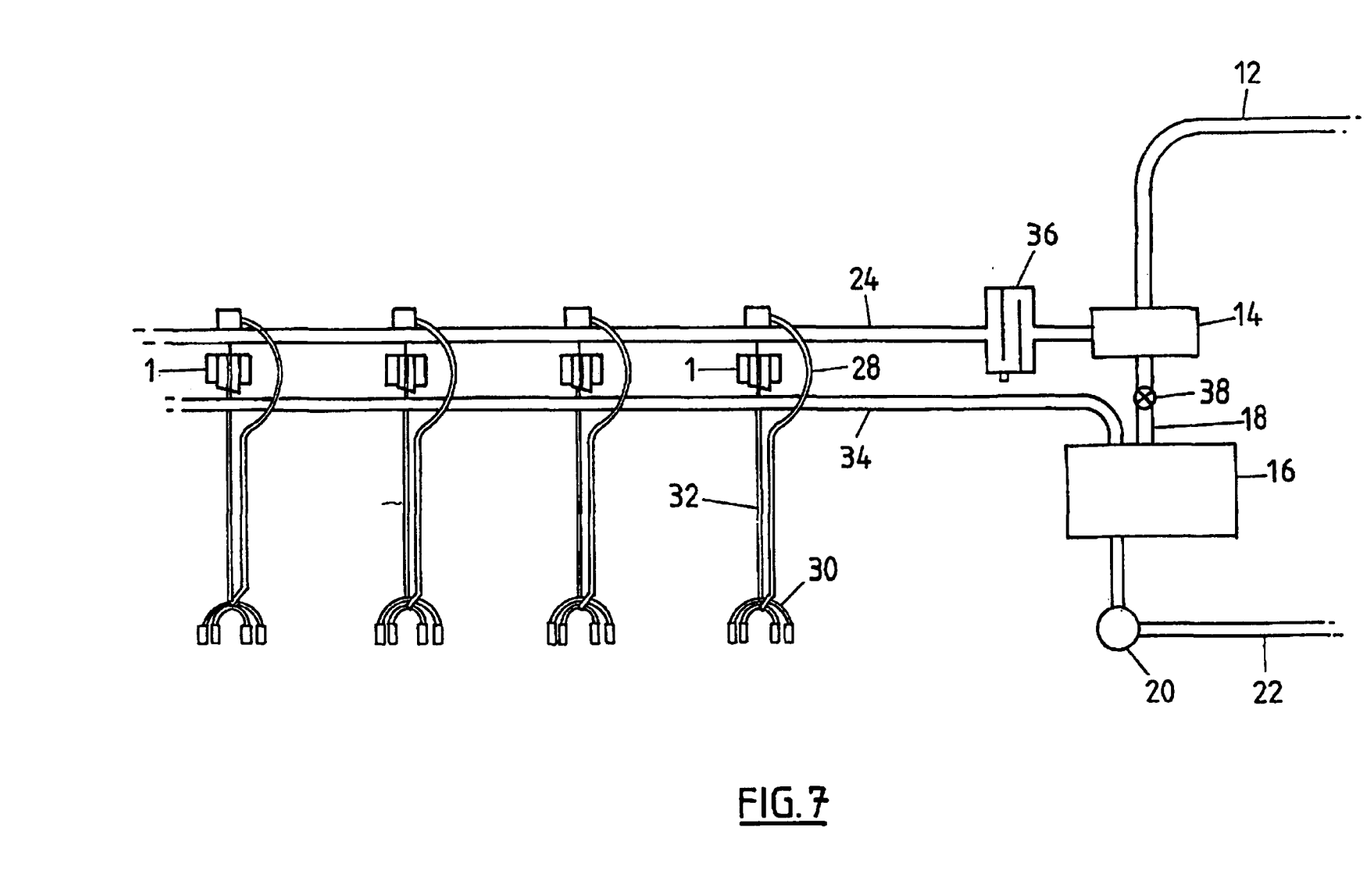
FIG. 7 is a schematic diagram of the milking system shown in FIG. 6 wherein a plurality of volumetric liquid metering devices in accordance with the present invention are incorporated into the system.

In FIG. 7 a plurality of volumetric liquid metering devices 1 are installed and piped as shown such that the vacuum supply can only be obtained from the second vacuum line 24.

The first milk delivery line 32 from the cups 30 is attached to the volumetric liquid metering device 1 via a liquid supply conduit 48 (See FIG. 1). The volumetric liquid metering device 1 is connected to the second milk delivery line 34 which transports the milk via the pump 20 through the third milk delivery line 22 to the main storage tank.

An additional commercial moisture trap 36 may be installed on the second vacuum line 24 to prevent any chance of moisture being transmitted to the vacuum pump. A suitable blocking means 38 is located between the receival vessel 16 and the second milk delivery line 34 in order to reduce the load on the vacuum pump by removing the receival vessel 16 and the second milk delivery line 34 from the vacuum circuit.

The layout of piping, as described above with reference to FIG. 7, leads to substantial energy savings. Currently, all known types of milk meter are installed on the first milk delivery line 32 and flow into the second milk delivery line 34.

It is envisaged that electronic circuitry would be installed to control the metering device and to record various information. For instance, because a cow lets down milk more quickly in the early stages of milking and more slowly in the later stages of milking the ability to vary the speed of the pulsation rate will be included in the electronic control options. In this way the pulsing action can be adjusted to be faster or slower so that the cow can be milked out more efficiently with a view to reducing the total milking time.

It is preferred that the devices 1 would be installed in an exactly vertical position however it is recognised that owing to dairy design this is not always possible and a few degrees either side of vertical is acceptable.

The mechanical means of metering the amount of liquid using the two metering chambers has been described. This amount of milk would be recorded using the electrical pulses that the float switch 58 transmits.

The preferred option will be for the capacity of each meter chamber 50 to be set to a predetermined volume prior to installation, then accurately recorded when installed by weighing the contents of each chamber 50 of the device 1 and transferring this data to a personal computer in order to record the individual capacities of each chamber of each device 1 installed.

Using standard computing techniques a running tally on each individual device would be logged by combining the gross volume of the first meter chamber 50a with the gross volume of the second meter chamber 50b. The total amount recorded for the device 1 would be displayed via a LCD or similar suitable visual display.

The dairy farmer needs the individual total for each cow and these would be transferred to a personal computer that will also keep a running tally of individual totals to provide a herd total for each milking.

This method of calibration has the advantage of reducing the necessity for sealing mechanisms and 0 rings that are prone to breakdown.

To record this information a keypad, preferably with visual display, would be designated for each volumetric liquid meter device 1 within a given dairy to enable entry of the cow's identification number and to record the volume of harvested milk in order for the data to be transferred to a personal computer or microprocessor.

A plurality of volumetric liquid metering devices 1 would be used in a milk harvesting system so that the milk production of all cows could be measured.

Whilst this invention has been described for measuring a pulsating flow of liquid as is required for the milk harvesting industry, it is intended that it can also be used for measuring continuous flow liquids as would be required for measuring or bottling liquids such as juices or wine. With continuous flow liquids the operator will set the required volume of the metering chamber using suitable commercial measuring apparatus. For measuring continuous flow liquids the vane pump could be replaced by a centrifugal pump and the volumetric liquid metering device 1 would merely require the valve mechanisms 3 relating to liquid inlet and liquid discharge, as the valve mechanism 3 required for controlling the vacuum supply is specific to milk harvesting.

The accurate measurement of petroleum is impeded by the presence of low molecular weight components, particularly methane, which tend to cause frothiness in the petroleum liquid. It is also envisaged that the volumetric liquid metering device 1 could be successfully adapted to measure petroleum. The device 1 is already arranged to apply a vacuum to the meter chamber 50 such that any volatile low molecular weight components could be separated from the petroleum liquid, thus reducing frothing. The device 1 could also be adapted such that a positive pressure could be applied to the meter chamber 50 to assist the discharge of low viscosity petroleum from the meter chamber 50.

Modifications and variations such as would be apparent to the skilled addressee are considered within the scope of the present invention.

What is claimed is:

1. A volumetric liquid metering device for measurement of continuous flow liquids comprising first and second meter chambers wherein each meter chamber is arranged to receive up to and including a predetermined volume of liquid;

each meter chamber being provided with:
      an inlet conduit for directing liquid into the meter chamber wherein the ingress of liquid through the inlet conduit and into the meter chamber is controlled by a first valve mechanism;
      a means to apply negative pressure to the meter chamber to draw liquid into the meter chamber via the inlet conduit;
      a volumetric metering means to indicate when the predetermined volume of liquid has entered the meter chamber;
      a discharge conduit for discharging liquid from the meter chamber wherein the discharge of liquid from the meter chamber through the discharge conduit is controlled by a second valve mechanism, the first and second valve mechanisms being actuated in response to a signal from the volumetric metering means; and
      a means to apply positive pressure to the meter chamber to encourage discharge of liquid from the meter chamber via the discharge conduit;
   wherein the first meter chamber is coupled to the second meter chamber via the first and second valve mechanisms, the first and second valve mechanisms being configured such that liquid is received in the second meter chamber when liquid is discharged from the first meter chamber, and vice versa.

2. The volumetric liquid metering device according to claim 1, characterised in that the meter chamber comprises a means to muffle liquid turbulence caused by a sudden ingress of atmospheric air into the volumetric liquid metering device.

3. The volumetric liquid metering device according to claim 1 or claim 2, characterised in that the volumetric metering means comprises a float switch movable between a first position, wherein the meter chamber is empty, and a second position, wherein the predetermined volume of liquid is received in the meter chamber, the float switch being arranged, in use, to transmit a signal when the float switch is in the second position.

4. The volumetric liquid metering device according to claim 3, characterised in that the predetermined volume of liquid received in the meter chamber can be adjusted by relocating the second position of the float switch.

5. The volumetric liquid metering device according to claim 1, characterised in that the means to apply negative pressure to the meter chamber comprises a vacuum conduit interconnecting a vacuum supply and the meter chamber.

6. The volumetric liquid metering device according to claim 1, characterised in that the means to apply positive pressure to the meter chamber comprises a source of compressed air interconnected to the meter chamber.

7. The volumetric liquid metering device according to claim 1, characterised in that the meter chamber is provided with a viewing panel.

8. The volumetric liquid metering device according to claim 1, characterised in that the device is provided with a probe and a timing means, wherein the probe and the timing means are arranged to transmit a signal to deactivate the volumetric metering means after no liquid has been sensed for a predetermined period of time in the inlet conduit.

9. The volumetric liquid metering device according to claim 1, characterised in that an upper portion of the meter chamber is provided with a plurality of laterally extending baffle plates.

10. The volumetric liquid metering device according to claim 9, characterised in that the baffle plates are perforated with randomly spaced apertures.

11. The volumetric liquid metering device according to claim 10, characterised in that the apertures are arranged in a staggered configuration.

12. The volumetric liquid metering device according to claim 1, characterised in that is muffled by liquid turbulence caused by a sudden ingress of atmospheric air into the volumetric liquid metering device comprises a blast chamber.

13. The volumetric liquid metering device according to claim 12, characterised in that the blast chamber is a box-like housing constructed around the inlet conduit, wherein the housing is provided with an opening to discharge fluid into a lower portion of the meter chamber.

14. The volumetric liquid metering device according to claim 12 or claim 13, characterised in that the blast chamber is provided with a downwardly inclined plate fixed to an underside of the blast chamber, wherein the plate segregates the meter chamber into an upper compartment and a lower compartment so that the sudden ingress of atmospheric air is directed to the upper compartment and received liquid is directed to the lower compartment.

15. The volumetric liquid metering device according to any one of claims 1 to 14, characterised in that the first and second valve mechanisms are caused to switch between the first meter chamber and the second meter chamber, and vice versa, in response to the signal from the volumetric metering means of respective first and second meter chambers.

* * * * *